United States Patent [19]

Croucamp et al.

[11] Patent Number: 5,762,099
[45] Date of Patent: Jun. 9, 1998

[54] VALVE SYSTEM

[75] Inventors: Frederik Wilhelm Croucamp; Lieb Johannes Rodolf Nunez, both of Pretoria, South Africa

[73] Assignee: ISCOR Limited, Pretoria, South Africa

[21] Appl. No.: 821,704

[22] Filed: Mar. 19, 1997

Related U.S. Application Data

[63] Continuation of Ser. No. 544,990, Oct. 30, 1995, abandoned.

[30] Foreign Application Priority Data

Mar. 30, 1995 [ZA] South Africa .................... 95/2615

[51] Int. Cl.[6] ............................................ F16K 49/00
[52] U.S. Cl. .................... 137/340; 137/375; 251/368
[58] Field of Search ...................... 137/340, 375; 251/368

[56] References Cited

U.S. PATENT DOCUMENTS

| | | | |
|---|---|---|---|
| 3,726,305 | 4/1973 | Erickson et al. | 137/341 |
| 3,770,005 | 11/1973 | Brandenburg | 137/340 |
| 3,941,186 | 3/1976 | Schneider | 137/340 |
| 4,161,959 | 7/1979 | Jonsen et al. | 137/340 |
| 4,402,337 | 9/1983 | Schuurman | 137/340 |
| 4,410,002 | 10/1983 | Schurrman | 137/340 |
| 5,062,445 | 11/1991 | Junier | 137/340 |

FOREIGN PATENT DOCUMENTS 1389405  1/1965  France .

*Primary Examiner*—A. Michael Chambers
*Attorney, Agent, or Firm*—Barry R. Lipsitz

[57] ABSTRACT

A valve (14,16) for handling a hot fluid material such as the coal dust formed in the smelting of direct reduced ore, in which those parts of the valve body (19) in direct contact with the material have double walls which contain a non-fluid medium (22) such as kaowool between them for heat insulating the walls, while those parts (26) which are not so in contact are cooled with a fluid medium such as water.

10 Claims, 3 Drawing Sheets

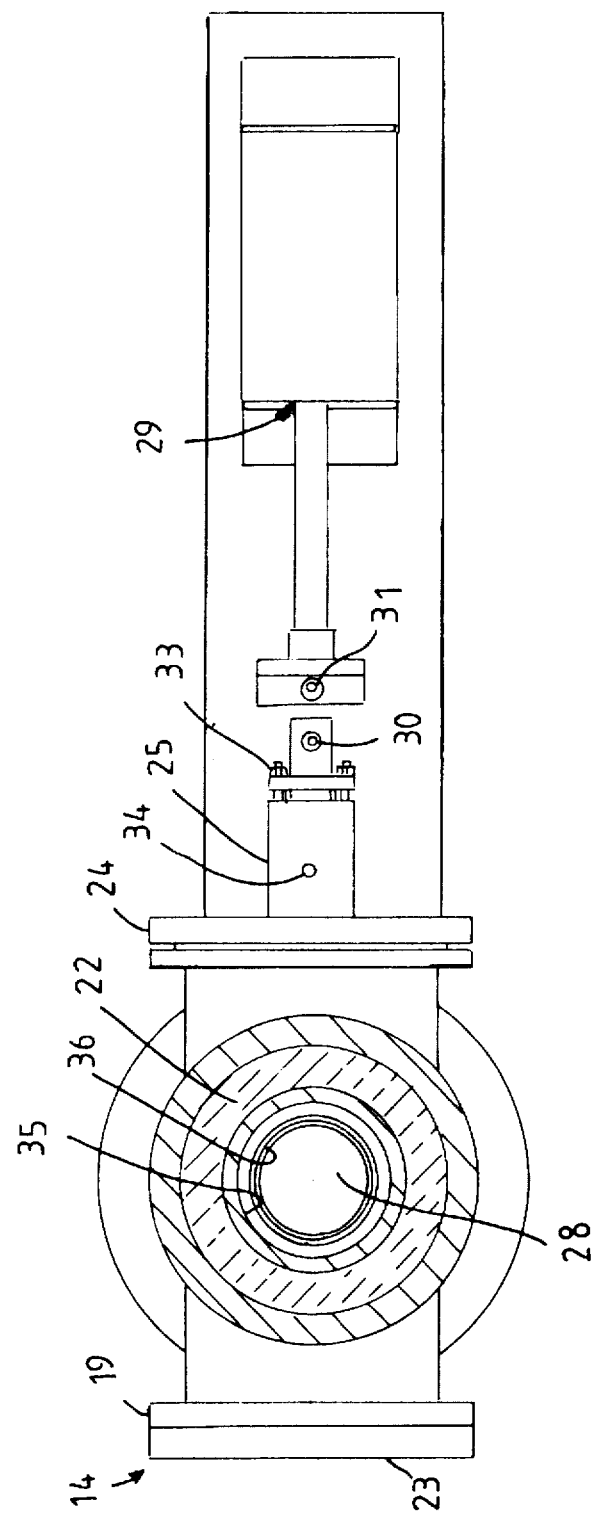

VALVE SYSTEM

This application is a continuation of commonly assigned, U.S. patent application Ser. No. 08/544,990 filed Oct. 30, 1995, now abandoned.

This invention relates to a valve, particularly one of the type employed in the transportation of hot fine particulate material such as, for example, the coal dust produced in the direct reduction smelting process of iron ore. One such a process is, for example, employed in the so called 'Corex-plant' of Iscor Limited at its Pretoria works in South Africa.

During such a smelting process the coal dust, together with gas which is produced in the reaction between the coal and the direct reduced iron, is passed through a cyclone where the dust is separated from the gas.

The dust is then re-utilised in the melter-gasifier by recirculating it via a lock system and dust burner to the melter-gasifier.

Such lock system comprises a plurality of dust chambers provided with valve controlled inlets and outlets through which the dust is passed on its way to the melter-gasifier.

Because of the relatively high temperature (700°–900° C.) and pressure (in the order of 3½ Bar) at which such valves have to operate, they are subjected to very high wear and tear and accordingly subject to frequent breakdowns.

In an attempt to overcome such problems in the aforesaid Corex-plant, specially designed valves are employed. These valves are characterised by the fact that the main body of the valve is water cooled.

A major disadvantage found with such valves is that because of the large difference in temperature between opposite sides of the walls of the box containing the water responsible for cooling the valve, such walls are subjected to very large thermal shocks with the result that the cooling water tends to penetrate the valve via its seals, walls and/or welds. This can give rise to a plurality of problems, amongst others damage to the refactory walls of the melter-gasifier through thermal shocks; an increase in the sulphur content of the iron being produced; and damage to and/or malfunctioning of the valve itself.

Another disadvantage found with such valves in that because of their specific construction they have to be removed in toto from the system in order to effect maintenance and/or repairs to them. This can, give rise to a substantial down time in the direct reduction process.

It is accordingly an object of this invention to provide a valve system for the aforesaid purpose with which the aforesaid problems may be overcome or at least minimised.

According to the invention a valve for handling a hot fluid material, particularly a fine particulate material such as the coal dust formed in the smelting of direct reduced iron ore, comprises a valve body of which at least some of the parts in direct contact with the hot fluid material are adapted to be heat insulated with a non-fluid medium such as a ceramic material, and those parts which are not in direct contact with the hot fluid material are adapted to be cooled with a fluid medium such as water.

Applicant has found that by keeping the fluid cooling medium away from those parts of the valve which are in direct contact with the hot fluid material, there is no or very little tendency for such fluid cooling medium to penetrate the interior of the valve body.

In the case of typical valves employed in such systems, it means that only the shaft carrying mechanism employed for moving the valve closure member responsible for opening and closing the valve along a slide in the valve will be fluid (water) cooled, while the rest of the body of the valve will not.

In a preferred form of the invention such rest of the body of the valve comprises a double insulating wall, and a ceramic insulating wool, such as kaowool, is contained between the walls.

Another advantage of the invention is that such rest of the body of the valve need not be of a special material but simply be made from any suitable material capable of enduring the particular plant operating pressure.

In a preferred form of the invention such material may for example, comprise boiler plate and/or mild steel.

Further according to the invention the valve body includes at least two oppositely located side walls and at least one lid closable opening in one of such side walls, through which opening access may be had to the inside of the valve body for inspection and/or maintenance purposes.

If required, the valve body may include two such side walls, each provided with such an opening and lid which are identical in size and configuration except that one of the lids is adapted to house the aforesaid shaft carrying mechanism by means of which the aforesaid valve closure member can be operated from outside the valve body.

The advantage of this arrangement is that if the slide on which the shaft carrying mechanism moves on the opening and/or closing of the valve located towards one side wall of the body gets damaged or worn out during use, the other undamaged slide located towards the opposite side wall of the body can be utilised by fitting the lid and mechanism through the other of the aforesaid openings of the valve body.

One embodiment of the invention will now be described by way of example with reference to the enclosed drawings, in which:

FIG. 3 is a top view, partly in cross section, on lines III:III of FIG. 2.

Figure 1:
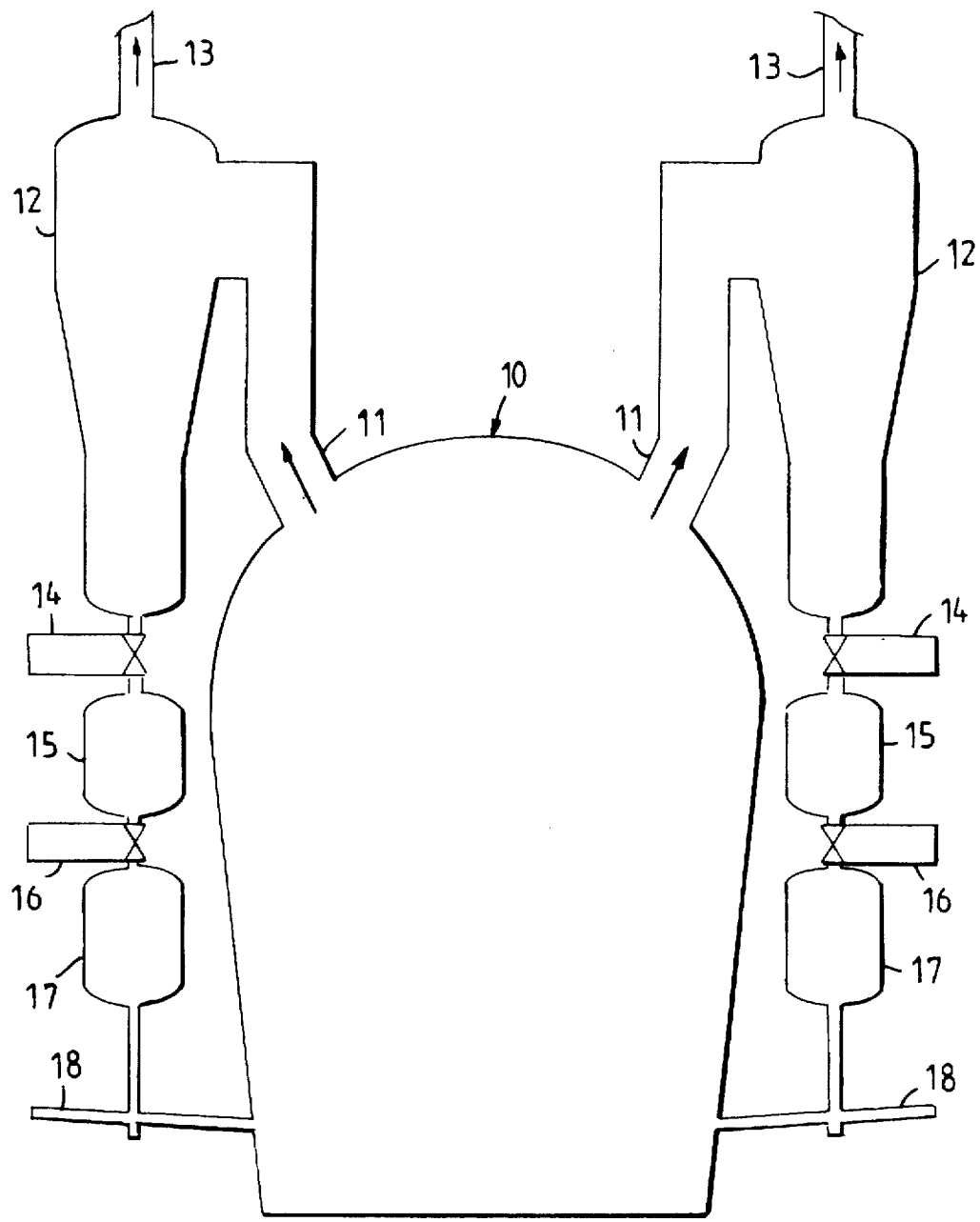
FIG. 1 is a diagrammatic side elevation of some of the equipment utilised in the melting of direct reducted iron ore, similar to that employed at Iscor's aforesaid Corex plant, and which includes four valve systems according to the invention.

Referring to FIG. 1, a melter-gasifier 10 in which the smelting of direct reduced iron ore is carried out is charged via suitable inlet screws (not shown) with the appropriate amounts of coal and direct reduced iron ore.

The coal dust laden gas which is produced in melter 10 is drawn out through two outlets 11 to each of two cyclones 12 from which most of the gas which is separated from the coal dust passes through outlets 13 for use elsewhere.

From cyclones 12, the gas laden coal dust passes via a first valve 14 according to the invention to a first dust chamber 15 and then via a second valve 16 according to the invention to a second dust chamber 17.

From chambers 17 the dust passes via a dust burner 18, together with added oxygen, into gasifier 10 where the dust burns spontaneously, thus providing additional heat to the gasifier.

The gas laden dust passing from cyclones 12 is at a temperature in the order of between 700° and 900° C. and at a pressure in the order of 3½ Bar, and the two dust chambers 15 and 17 and their associated valves 14 and 16 are accordingly operated in the manner of a lock system in order to overcome pressure differences.

Figure 2:
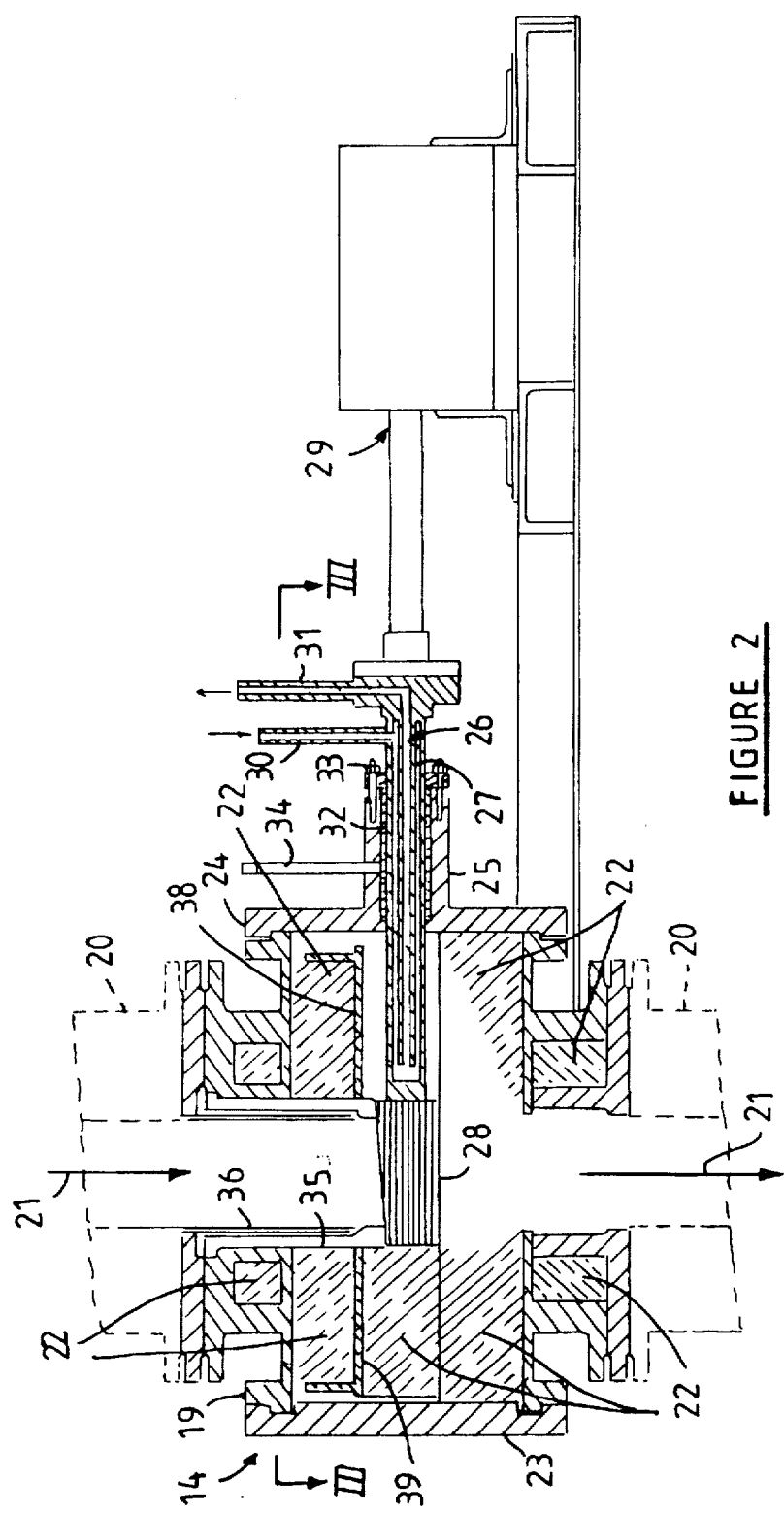
FIG. 2 is a diagrammatic cross sectional view of one of the valves of FIG. 1.

Each of the valves 14 and 16, one of which, 14, is shown in more detail in FIG. 2, comprises a hollow open ended valve body 19 of which the two open ends are connected to the dust line 20 so that the gas laden dust can pass through it in the direction of arrows 21.

Valve body 19 comprises double walls of boiler plate (steel to BS (British Standard) 1501-224 GR 490A), which is strong enough to withstand the aforesaid pressure. The area between the walls is filled with a suitable ceramic material 22 such as Kaowool as heat insulating medium.

Two opposite side walls of body 19 are each provided with an opening which is closable by means of a lid 23 and 24 respectively, the openings and lids being identical in size and configuration except that lid 24 includes an annular transversely extending sleeve 25 in which a shaft carrying mechanism 26 can be received slidably.

One end of the shaft 27 of mechanism 26 is connected to a valve closure member 28, while its other end is connected to a pneumatically operated piston and cylinder 29 by means of which the valve can be opened or closed by sliding closure member 28 along slide 38.

Said shaft 27, which is hollow and which has its interior cooled by means of cooling water which passes through it via conduits 30 and 31, is received in the bore of sleeve 25 in annular seals 32, the cooling water serving to protect the seals.

Seals 32 are adjustable by means of a mechanism 33 fitted to the one end thereof in order to cater for any wear which may occur in them during use.

The bore of sleeve 25 is maintained under a positive pressure by passing a suitable cooling gas, such as nitrogen, for example, via a conduit 34 into it. This ensures that if any leakage in the seals occurs, the flow will take place from the seal to the interior of the valve body, thus preventing any gas from escaping from the valve to the outside.

Valve closure member 28, which is of a suitable metal such as stainless steel of AISI (American Institute of the Steel Industry) 310 grade, has its upper or sealing face sloping at an angle so that the member is of substantially wedge like shape. This ensures that a very positive seal is established on closing of the valve.

The outside surface of shaft 27 is preferably chromed in order to minimise any wear in the seal area.

The bore of the valve includes a sleeve 35, which may be of stainless steel (preferably AISI 310), and of which the leading lower end defines the cooperating sealing surface for closure member 28. Sleeve 35 is heat protected by means of a loose lining 36 of similar material.

The opening covered by lid 23 serves as means for gaining access to the interior of valve body 19 for inspection and/or maintenance purposes.

Because lids 23 and 24 are of the same size and configuration they may be interchanged on the aforesaid two openings in order to insert valve closure member 28 from the opposite side in order to cope with any wear which might have taken place in the slide 38, i.e. by utilising the undamaged slide 39 provided on the opposite side of valve body 1 9.

It will hence be appreciated that because the cooling water circulating through shaft 27 does not come near any of the surfaces of valve body 19 which are in direct contact with the hot dust laden gas, and also because shaft 27 does not contain any welds or the like, there is substantially no possibility for such cooling water to leak into the interior of valve body 19.

Applicant has accordingly found that substantially none of the water-related problems referred to above as occurring with the specially designed valves referred to in the preamble of this specification are encountered and that the valve systems according to the invention have a much longer life span, substantially problem free, compared to such valves.

Furthermore, because, easy access may be had to the interior of valve body 19, inspection and/or maintenance can be carried out with the minimum of effort and without disrupting the operation of the valve for any considerable period of time. It will be appreciated that there are no doubt many variations in detail possible with a valve system according to the invention without departing from the spirit and/or scope of the appended claims.

We claim:

1. A valve for handling a hot fluid material, particularly, a fine particulate material such as the coal dust formed in the smelting of direct reduced iron ore, comprising:

an upper valve portion defining an upper passageway for receiving the hot fluid material;

a lower valve portion defining a lower passageway for expelling the hot fluid material;

a valve closure member which is slidably positionable in a closed position to block a flow of the hot fluid material from said upper passageway to said lower passageway, and in an open position wherein the flow of the hot fluid material from said upper passageway to said lower passageway is allowed;

said valve portions including a sleeve region which is proximate to said passageways and an outer valve region which is distal from said passageways, said sleeve region and outer valve region substantially surrounding said passageways and defining at least one annular cavity therebetween which also substantially surrounds said passageways;

said at least one annular cavity being adapted to receive a non-fluid insulating medium such as a ceramic material which heat-insulates said valve while maintaining a temperature difference between said sleeve region and said outer valve region;

a valve passage positioned to carry an elongated shaft having two opposite ends, one end of said shaft being attached to said valve closure member, and the other end of said shaft being adapted for securement to a means for causing said slidable positioning of said valve closure member;

said elongated shaft including a passage formed therein for carrying a fluid for cooling said elongated shaft in such a manner that the cooling fluid is confined to said elongated shaft.

2. The valve of claim 1 wherein the ceramic insulating material comprises kaowool.

3. The valve of claim 1 further comprising:

at least two oppositely located side walls and at least one lid closable opening in one of said side walls, through which opening access may be had to the inside of the valve body for inspection and/or maintenance purposes.

4. The valve of claim 3 wherein:

the valve includes two of said lid closable openings and corresponding lids which are located in said opposite side walls, said two openings and lids being identical in size and configuration except that one of the lids is adapted to house said elongated shaft by means of which said valve closure member can be operated from outside the valve.

5. The valve of claim 1, wherein:

said sleeve region comprises at least one of boiler plate and mild steel.

6. The valve of claim 1, wherein:

said outer valve region comprises at least one of boiler plate and mild steel.

7. The valve of claim 1, wherein:

said upper valve portion includes an inner lining which communicates directly with the hot fluid material in said upper passageway for heat-protecting said sleeve.

8. The valve of claim 7, wherein:

said inner lining comprises a sleeve of stainless steel.

9. The valve of claim 1, wherein:

said valve passage and elongated shaft extend substantially transversely to a flow direction of said hot fluid material in said valve.

10. The valve of claim 1, wherein:

said cooling fluid comprises water.

* * * * *